United States Patent
Hartinger

(10) Patent No.: US 7,324,017 B2
(45) Date of Patent: Jan. 29, 2008

(54) METHOD FOR IDENTIFYING A TOLL-REQUIRED SECTION OF ROAD

(75) Inventor: Horst Hartinger, Feldbach (AT)

(73) Assignee: Siemens AG Osterreich, Vienna (AT)

( * ) Notice: Subject to any disclaimer, the term of this patent is extended or adjusted under 35 U.S.C. 154(b) by 220 days.

(21) Appl. No.: 11/077,941

(22) Filed: Mar. 11, 2005

(65) Prior Publication Data

US 2005/0258978 A1    Nov. 24, 2005

(30) Foreign Application Priority Data

Sep. 12, 2002  (AU)  ............... A 1372/2002
Sep. 9, 2003   (AU)  ....... PCT/AT03/00267

(51) Int. Cl.
*G08G 1/123*   (2006.01)

(52) U.S. Cl. ............... 340/989; 340/928; 701/209

(58) Field of Classification Search ............ 340/989, 340/928, 426.19, 988; 455/406; 701/209, 701/213

See application file for complete search history.

(56) References Cited

U.S. PATENT DOCUMENTS

| | | | | |
|---|---|---|---|---|
| 5,023,798 | A | 6/1991 | Neukirchner et al. | 364/449 |
| 5,717,389 | A * | 2/1998 | Mertens et al. | 340/928 |
| 5,857,152 | A | 1/1999 | Everett | 455/406 |
| 5,933,114 | A | 8/1999 | Eizenhofer et al. | 342/457 |
| 6,744,383 | B1 * | 6/2004 | Alfred et al. | 340/988 |
| 6,959,282 | B2 * | 10/2005 | Kakihara et al. | 705/13 |
| 7,012,547 | B2 * | 3/2006 | Hassett | 340/928 |
| 7,053,793 | B2 * | 5/2006 | Tajima et al. | 340/928 |
| 7,123,879 | B2 * | 10/2006 | Koketsu et al. | 455/41.2 |
| 7,151,998 | B2 * | 12/2006 | Tajima | 701/209 |

FOREIGN PATENT DOCUMENTS

| | | |
|---|---|---|
| DE | 4344433 A1 | 12/1993 |
| EP | 1006340 A2 | 6/2000 |
| EP | 1096230 A2 | 5/2001 |
| WO | WO 9514908 A | 6/1995 |
| WO | WO 9520801 | 8/1995 |
| WO | WO 9834199 | 8/1998 |
| WO | WO 9933027 | 7/1999 |
| WO | WO 2004025573 A1 | 3/2004 |

OTHER PUBLICATIONS

International Search Report, PCT/AT03/00267 mailed Dec. 22, 2003 ( 3 pages).
Preliminary International Examination Report, PCT/AT03/00267 mailed May 6, 2004 ( 4 pages) ( translation 1 page).

* cited by examiner

*Primary Examiner*—Phung T. Nguyen
(74) *Attorney, Agent, or Firm*—Anton P. Ness; Fox Rothschild LLP

(57) ABSTRACT

A process for determining travel through at least one toll road section by at least one vehicle (FAR) by means of a position determination system (POS) which is set up to determine the current position of the at least one vehicle (FAR), whereby positions of the at least one vehicle (FAR) are compared with the position of at least one reference point characteristic for an entrance (AUF) to a toll road section, whereby the orientation (ORI) of the vehicle is determined within a specifiable region (BER) about the entrance (AUF), whereby it is determined whether the orientation (ORI) determined agrees within a specifiable tolerance range with the orientation (ORA) characteristic of entry onto the toll road section.

8 Claims, 2 Drawing Sheets

METHOD FOR IDENTIFYING A TOLL-REQUIRED SECTION OF ROAD

CROSS-REFERENCE TO RELATED APPLICATION

This application claims priority from PCT Application Ser. No. PCT/AT2003/00267, filed Sep. 9, 2003, which claims priority from Austrian Patent Application No. A 1372/2002 filed Sep. 12, 2002.

FIELD OF THE INVENTION

The invention concerns a process for determining whether at least one vehicle passes through at least one road section requiring payment of toll by means of a position-determining system which is set up so as to determine the current position of the at least one vehicle, whereby positions of the at least one vehicle are compared with the position of at least one characteristic reference point for entry to a road section requiring payment of a toll.

The invention further concerns a toll system with a position determining system which is set up so as to determine the instantaneous position of a vehicle, whereby the vehicle has a control arranged to compare positions of the vehicle with the position of the characteristic reference points for the at least one road section requiring payment of a toll.

BACKGROUND OF THE INVENTION

A toll system or process of the type specified above, is known from DE 43 44 433 A1. In the known process, current position coordinates are determined from a GPS receiver and compared with entrance/exit coordinates of a highway section stored in an internal electronic vignette. If these coordinates agree, they are transmitted by means of the digital mobile network to a billing center external to the vehicle. In the billing center, the number of kilometers of highway driven and the highway fee due from that are calculated.

WO 95/20801 discloses a process and an arrangement for determining use fees for traffic routes and/or traffic areas in which the position data of the vehicle are determined by a position determination system and compared with the positions of virtual toll sites. The position data can be transmitted to a central site external to the vehicle, whereby the fees for the vehicle can also be calculated in a toll device in the vehicle and the fees determined can be transmitted to the central site, where they can be deducted from an account. A major disadvantage of this process is that the vehicle position must be determined continuously and there is no possibility of an anonymous debiting.

WO 99/33027 describes a process for levying tolls, in which the current position of the vehicle is compared with the position of a virtual toll site to calculate tolls, such that when a vehicle passes through a physical toll station, a communication connection is made between the vehicle and a central toll control site to pay the tolls due. After a successful payment transaction a communications link is set up between the toll station and the vehicle, through which a receipt for the proper payment of the fee is transmitted.

It is a disadvantage of the known process that its accuracy is relatively poor in determining whether there has been an entry onto a toll road section, as only passage through a point is registered.

It is, therefore, an objective of the invention to overcome the disadvantage of the state of the art specified above.

SUMMARY OF THE INVENTION

This objective is attained according to the invention, with a process of the type initially stated, such that the orientation of the vehicle is determined within a predetermined region around the entrance, whereby it is determined whether the orientation determined agrees within a predetermined tolerance range with the characteristic orientation for entry onto the toll road section.

The solution according to the invention makes it possible, by determining the orientation and thus the direction of travel of a vehicle in the vicinity of an entrance to a toll road section and to state with very high accuracy the probability of using this road section.

In one preferred variant of the invention, there is a check whether the vehicle is within a minimum distance from the entrance before the orientation is determined, whereby after the vehicle is within the minimum distance there is a test whether the vehicle is in the vicinity of the entrance at which the determination of orientation is done.

According to one advantageous embodiment of the invention, if the orientation determined for the vehicle matches the characteristic orientation for entrance, within the tolerance limits, a test is done whether the vehicle passes at least one control point along the toll road section.

It is desirable for the position data determined from the position determination system to be compared with the georeference data of an electronic map to determine the position of the vehicle with respect to the at least one entrance and the orientation of the vehicle in the region whereby, however, only a reduced number of the parameters important for the process according to the invention, such as the position of the entrance, need be taken from the digital map. In this way, the necessary memory capacity can be kept low.

A toll system of the type stated initially, which is set up so as to determine the orientation of the vehicle inside a predetermined region around at least one entrance on a toll road section, is particularly suited to carry out this process according to the invention, with the toll system being further aimed at checking whether the orientation agrees, within a specifiable tolerance range, with a characteristic entrance orientation.

In another aspect of the invention, the toll system can be set up to check whether the vehicle is within a minimum distance from the entrance before the vehicle enters the orientation determination region about the entrance.

The toll system can also be set up to check whether the vehicle is in the region about the entrance after the vehicle is within the minimum distance of the entrance.

Furthermore, the toll system can be set up to check whether the vehicle passes at least one control point located along the toll road section if the orientation determined for the vehicle in the region around the entrance agrees within the tolerance limits with the orientation characteristic of entry.

The toll system can advantageously be set up to compare the position data determined from the position determination system with georeference data from an electronic map so as to determine the position of the vehicle with respect to the at least one entrance and the orientation of the vehicle in the region around the entrance.

BRIEF DESCRIPTION OF THE DRAWINGS

The invention and other advantages are explained in more detail in the following, using some non-limiting example embodiments shown. They show schematically.

DETAILED DESCRIPTION OF THE PRESENT INVENTION

Figure 1:
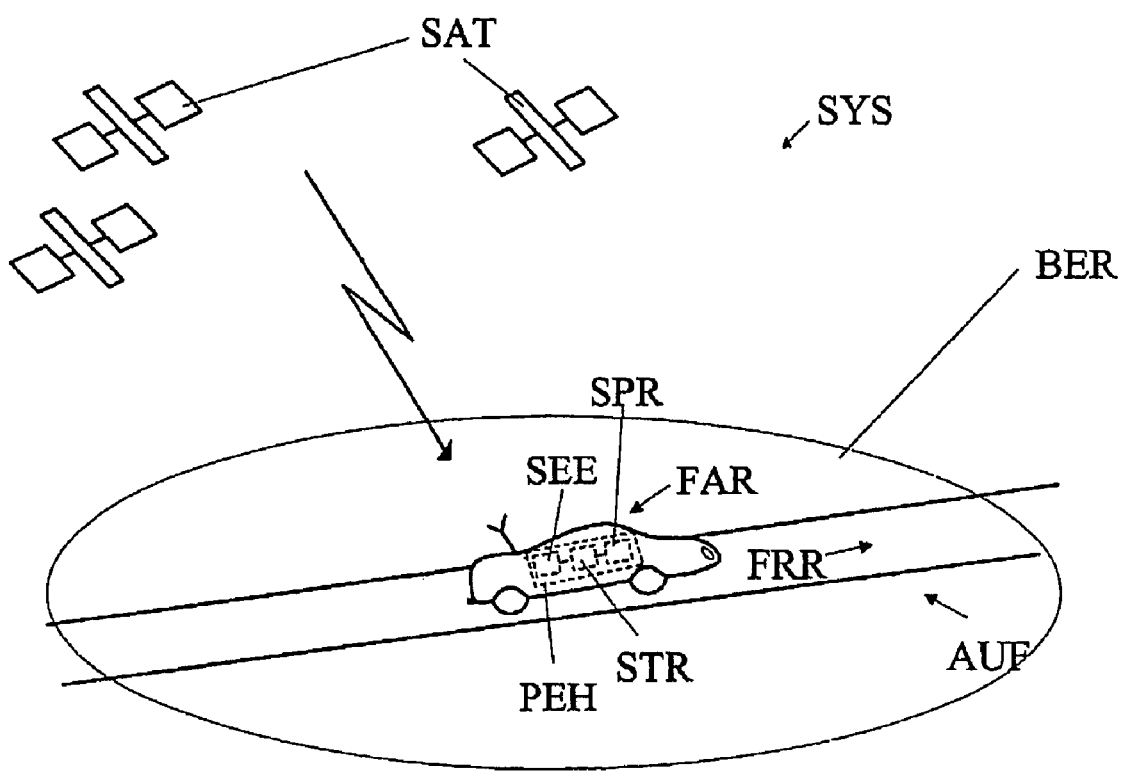
FIG. 1: a toll system according to the invention.

As shown in FIG. 1, a toll system SYS according to the invention has a position determination system POS, such as a global positioning system, abbreviated GPS, which is itself known. As GPS is a system long known to those skilled in the art, no detailed presentation and explanation of the system is given here.

In the example of a GPS system, an appropriate GPS module can be provided on board a vehicle FAR to determine position data. However, the invention is not limited to the GPS. In principle, the process according to the invention and the traffic monitoring system SYS according to the invention can also be realized with other known position determination systems. For example, inertial navigation systems are suitable for topographically difficult sections of road. Inertial navigation systems are also known in large numbers. For instance, EP 1 096 230 describes an inertial navigation system for vehicles, which can be used jointly with a GPS system or with other navigation systems to determine the position of a vehicle. Likewise, the process according to the invention can be applied to other satellite and terrestrial location systems.

Figure 2:
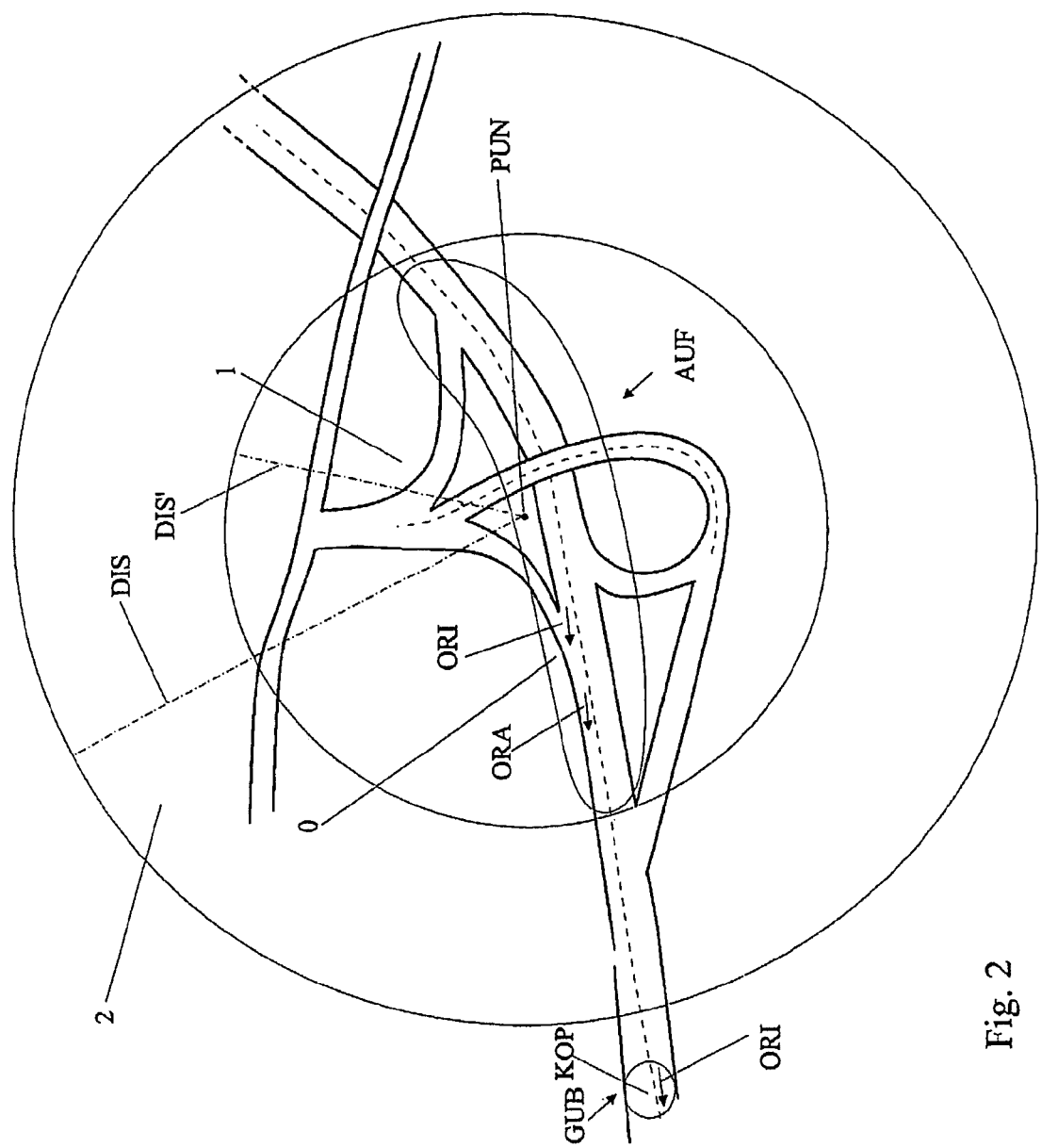
FIG. 2: the course of a process according to the invention.

With particular reference to FIG. 2, aside from the instantaneous position, the travel direction FRR of the vehicle FAR can also be determined from the position determination system POS in a manner which is itself known. For instance, the instantaneous orientation ORI of the vehicle FAR, i. e., its direction of travel, can be determined unambiguously from the change in position of the vehicle FAR with time.

For example, the instantaneous position or the orientation ORI of the vehicle FAR can be calculated from the position data in a control STR, such as an appropriately programmed microprocessor, a position determination unit PEH on board the vehicle FAR. For this purpose, the control STR can be set up to receive reference signals of the position determination system over a communication unit SEE from transmitting stations such as satellites, and to determine the current position data from them. In the case of the GPS system, the orientation information is obtained jointly with the position data in the position determination unit PEH and made available. This case is assumed in the following, generally without limitation.

The control STR links the information of the current position data from the position determination system with the georeference data stored in a memory unit SPR, which also contains the coordinates of the entrances AUF on a toll road section. In this way each toll road section can be assigned a section identification. Furthermore, characteristic orientations ORA, i.e., travel directions, are assigned to each entrance AUF in the georeference data, which can be parameterized as angles in the known manner. For example, the georeference data can be taken from an ordinary commercial electronic map, such as Austrian Map 2.0 of the Austrian Federal Office for Standards and Calibration, or even filed in a storage unit SPR in the form of an electronic map.

According to the invention, current positions of the vehicle FAR are compared with the positions of reference points characteristic for an entrance AUF to a toll road section. If the current position of the vehicle FAR is within a predetermined region BER about the entrance AUF the orientation ORI of the vehicle, i. e., the travel direction of the vehicle is determined, whereby a test is done whether the vehicle's determined orientation ORI agrees, within a predetermined tolerance range, with a characteristic entrance orientation ORA. As a result of the test, the control STR provides either the section identification of a toll road section, or a value appropriate for no identified section.

As shown in FIG. 2, identification of use of an entrance AUF can be done in steps. For this purpose, three validity ranges, 2, 1, 0, which are activated or passed through in order, can be defined for identifying an entrance AUF, according to one advantageous variant of the invention.

Validity range 2 can be activated for a distance less than a predetermined distance DIS from a reference point PUN assigned to the entrance AUF, the coordinates of which can be stored in a storage unit SPE of a vehicle FAR for the georeference data linked with the control STR. To check whether the vehicle is within validity range 2 of an entrance AUF, the distances of the current GPS position can be calculated from all the entrances AUF defined in the georeference data.

Validity range 1 is activated if validity range 2 has already been activated and if the distance of the vehicle from the entrance AUF is less than the distance DIS' assigned to validity range 1.

Validity range 0 is activated only if validity ranges 2 and 1 have already been activated and the difference between the current orientation ORI of the vehicle FAR and the orientation ORA of the entrance AUF stored in the georeference data is less than a specifiable value, such as 15°.

If validity range 0 for the entrance AUF is activated, then one or more control points KOP of that toll road section can be activated. That is, a check is done whether these control points are passed through after identification of an entry AUF of the vehicle. For this purpose the control STR can be set up so as to make the control point "active" when the entrance is passed. That is, only identification of an entry AUF initiates monitoring in the control STR whether one or more control points KOP are passed. The coordinates of the control point or points can also be stored in the memory unit SPR and can be compared with the current position of the vehicle FAR.

A toll road section can be identified as traveled if the current position of the vehicle lies within a validity range GUB of a control point KOP, or if a straight line calculated from the current and previous position data intersect the validity region GUB of the control point KOP. To avoid problems from temporary failure of the position determination system, the time span between the current and previous position data can be parameterized. That further reduces the risk of incorrect detection of a section. The reliability with which passing the control point KOP can be detected, can be increased by the orientation ORI of the vehicle FAR being in a predetermined range, within a specified tolerance, around the control point KOP.

By the combination of identification of an entrance AUF, activation of the control point KOP and monitoring of passage past a control point KOP on the section, travel by vehicle FAR along a toll road section can be determined with high accuracy.

The invention claimed is:

1. A process for determining whether at least one toll road section is traveled by at least one vehicle by means of a position determination system which is set up to determine the current position of the at least one vehicle, so that positions of the at least one vehicle are compared with the position of at least one reference point characteristic for an entrance to a toll road section, comprising the steps of:
   determining if the distance of the vehicle from the entrance is less than a predetermined distance;
   determining if the vehicle is in a first orientation determination region around the entrance; and
   determining the orientation of the vehicle within the first orientation determination region around the entrance, whereby it is determined whether the vehicle's determined orientation agrees, within a predetermined tolerance range, with a characteristic entrance orientation.

2. The process according to claim 1, further including, if there is agreement within the predetermined tolerance range of the vehicle's determined orientation in the first orientation determination region with the characteristic entrance orientation, the step of determining if the vehicle passes at least one control point along the toll road section.

3. The process according to claim 2, further including the step of comparing the position data determined from the position determination system with georeference data from an electronic map to determine the position of the vehicle with respect to the at least one entrance and the vehicle's determined orientation in a second orientation determination region.

4. The process according to claim 1, further including the step of comparing the position data determined from the position determination system with georeference data from an electronic map to determine the position of the vehicle with respect to the at least one entrance and the vehicle's determined orientation in a second orientation determination region.

5. A toll system having a position determination system which is set up to determine the instantaneous position of a vehicle, whereby the vehicle has a control set up to compare positions of the vehicle with the position of reference points characteristic for the at least one toll road section, characterized in that the system includes a test to determine if the distance of the vehicle from the entrance is less than a predetermined distance, the system includes a further test to determine if the vehicle is within a first orientation determination region about the entrance, and the system includes a further test to determine the vehicle's orientation within the first orientation determination region around the entrance, whereby the system is further set up to check if the vehicle's determined orientation agrees, within a predetermined tolerance range, with a characteristic entrance orientation.

6. The toll system according to claim 5, characterized in that, if the vehicle's determined orientation in the second orientation determination region agrees, within the predetermined tolerance range, with the characteristic entrance orientation, the system includes a test to determine if the vehicle passes at least one control point along the toll road section.

7. The toll system according to claim 6, characterized in that the system is set up to compare the position data determined from the position determination system with georeference data from an electronic map to determine the position of the vehicle with respect to the at least one entrance and the vehicle's determined orientation a second orientation determination region.

8. The toll system according to claim 5, characterized in that the system is set up to compare the position data determined from the position determination system with georeference data from an electronic map to determine the position of the vehicle with respect to the at least one entrance and the vehicle's determined orientation in the second orientation determination region.

* * * * *